(12) United States Patent
Higashino et al.

(10) Patent No.: US 6,486,586 B2
(45) Date of Patent: Nov. 26, 2002

(54) ALTERNATOR

(75) Inventors: Kyoko Higashino, Tokyo (JP); Yoshihito Asao, Tokyo (JP); Katsumi Adachi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/770,277

(22) Filed: Jan. 29, 2001

(65) Prior Publication Data

US 2001/0040418 A1 Nov. 15, 2001

(30) Foreign Application Priority Data

Feb. 29, 2000 (JP) ........................................ 2000-053528

(51) Int. Cl.[7] ................................................ H02K 1/22
(52) U.S. Cl. ........................... 310/263; 310/45; 310/64; 310/260
(58) Field of Search ........................... 310/263, 58, 59, 310/42, 43, 44, 45, 64, 62, 63, 256, 258, 260, 179

(56) References Cited

U.S. PATENT DOCUMENTS 4,442,371 A * 4/1984 Utsunomiya et al. ....... 310/260
4,739,204 A * 4/1988 Kitamura et al. ......... 310/68 D
5,708,316 A * 1/1998 Ishida ........................ 310/184
6,429,552 B2 * 8/2002 Asao et al. ................... 310/64

FOREIGN PATENT DOCUMENTS

JP 54-183601 12/1979
JP 11-164505 6/1999

* cited by examiner

Primary Examiner—Nestor Ramirez
Assistant Examiner—Thanh Lam
(74) Attorney, Agent, or Firm—Sughrue Mion, PLLC

(57) ABSTRACT

An alternator includes a rotor including claw-shaped magnetic poles fitted onto a rotating shaft, and a cooling means disposed on an end surface of the claw-shaped magnetic poles, and a stator including a stator core disposed facing the rotor, the stator core having a plurality of slots, and a stator winding installed in the stator core, the stator being cooled by the cooling means, and a bracket for supporting the rotor and the stator, a passage for an air flow generated by the cooling means being disposed inside the bracket, the stator winding including coil ends extending outwards from end surfaces of the stator core, and a shielding material being disposed so as to cover at least an inner circumferential surface of the coil ends.

10 Claims, 15 Drawing Sheets

▨ EPOXY RESIN

░ VARNISH

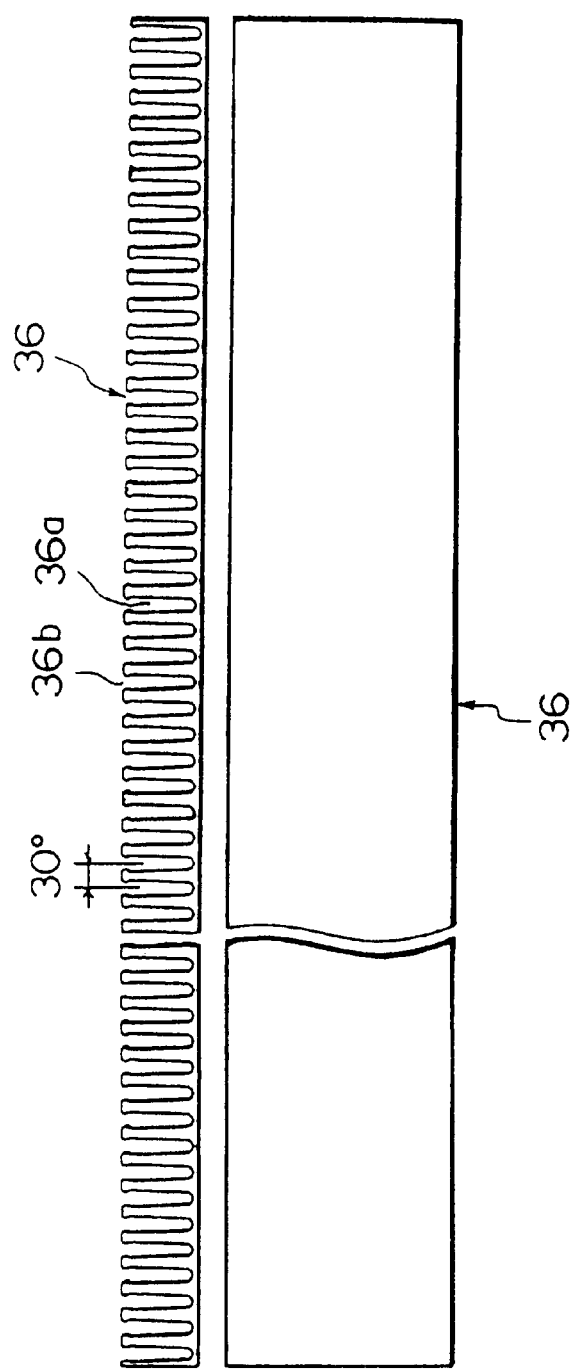

ALTERNATOR

BACKGROUND OF THE INVENTION

1. Field of the Invention

The present invention relates to an alternator driven by an internal combustion engine, for example, and in particular, relates to a stator construction for an alternator mounted to an automotive vehicle such as a passenger car or a truck.

2. Description of the Related Art

FIG. 15 is a perspective showing a stator of a conventional alternator. In the stator 208 of the conventional alternator, wind noise is reduced by smoothing surfaces having irregularities due to a number of bundles of coils by disposing a resin 202 so as to completely cover coil end portions which are portions of the coils which are exposed outside a stator core 15. That is to say, in the coil end portions, the coils, which generate heat, are cooled by a cooling air flow generated by a fan disposed on a rotor which is not shown, but by disposing the resin 202 and making the surfaces of the coil ends smooth, interference between the fan and the coils is decreased, reducing wind noise.

However, in the conventional alternator constructed in this manner, because the coil ends are completely covered by the resin 202, the environment becomes severe for the coil ends, which are heat-generating bodies, and this has a large deleterious effect on output from the alternator. Furthermore, in molding the resin 202, because a mold completely covering the coil end portions is prepared, for example, and softened resin is poured into the mold and hardened, workability has been poor.

If the alternator is a three-phase alternator, because three coil turn groups partially overlap in the coil end portions and are not aligned, it is difficult to distribute the resin 202 disposed on the coil end portions uniformly around the entire circumference, making the shape of the resin 202 biased in both an axial direction and a circumferential direction, causing cooling to become non-uniform and wind noise to worsen.

SUMMARY OF THE INVENTION

The present invention aims to solve the above problems and an object of the present invention is to provide an alternator which can improve cooling of a stator winding and reduce wind noise.

In order to achieve the above object, according to one aspect of the present invention, there is provided an alternator including: a rotor including:
  claw-shaped magnetic poles fitted onto a rotating shaft; and
  a cooling means disposed on the claw-shaped magnetic poles; and a stator including:
  a stator core disposed facing the rotor, the stator core having a plurality of slots; and
  a stator winding installed in the stator core, the stator being cooled by the cooling means; and a bracket for supporting the rotor and the stator, a passage for a cooling air flow generated by the cooling means being disposed inside the bracket, the stator winding including coil ends extending outwards from end surfaces of the stator core, and a shielding material being disposed so as to cover at least an inner circumferential surface of the coil ends.

Apertures may be formed in a main surface of the shielding material.

Protrusions and recesses may be formed on a surface of the shielding material.

The shielding material covering the coil ends may be secured by a second resin whose thermal conductivity is greater than a first resin disposed on the coil ends.

Return portions of the stator winding crossing over between slots separated at a predetermined pitch may be formed with a generally identical shape in a circumferential direction in at least one of the coil ends of the stator.

Spaces between circumferentially-adjacent return portions of the stator winding crossing over between slots separated at a predetermined pitch may be formed so as to be generally identical in at least one of the coil ends of the stator.

A cross-sectional shape of conductors of the stator winding within the slots may be a generally rectangular shape following a shape of the slots.

In addition, at least one of said coil ends may be disposed in close proximity to a downstream end of the cooling air flow generated by the cooling means.

BRIEF DESCRIPTION OF THE DRAWINGS

FIG. 9A is a side elevation explaining the construction of a stator core used in this alternator;

FIG. 9B is a rear elevation explaining the construction of the stator core used in this alternator;

DETAILED DESCRIPTION OF THE PREFERRED EMBODIMENTS

Embodiment 1

Figure 1:
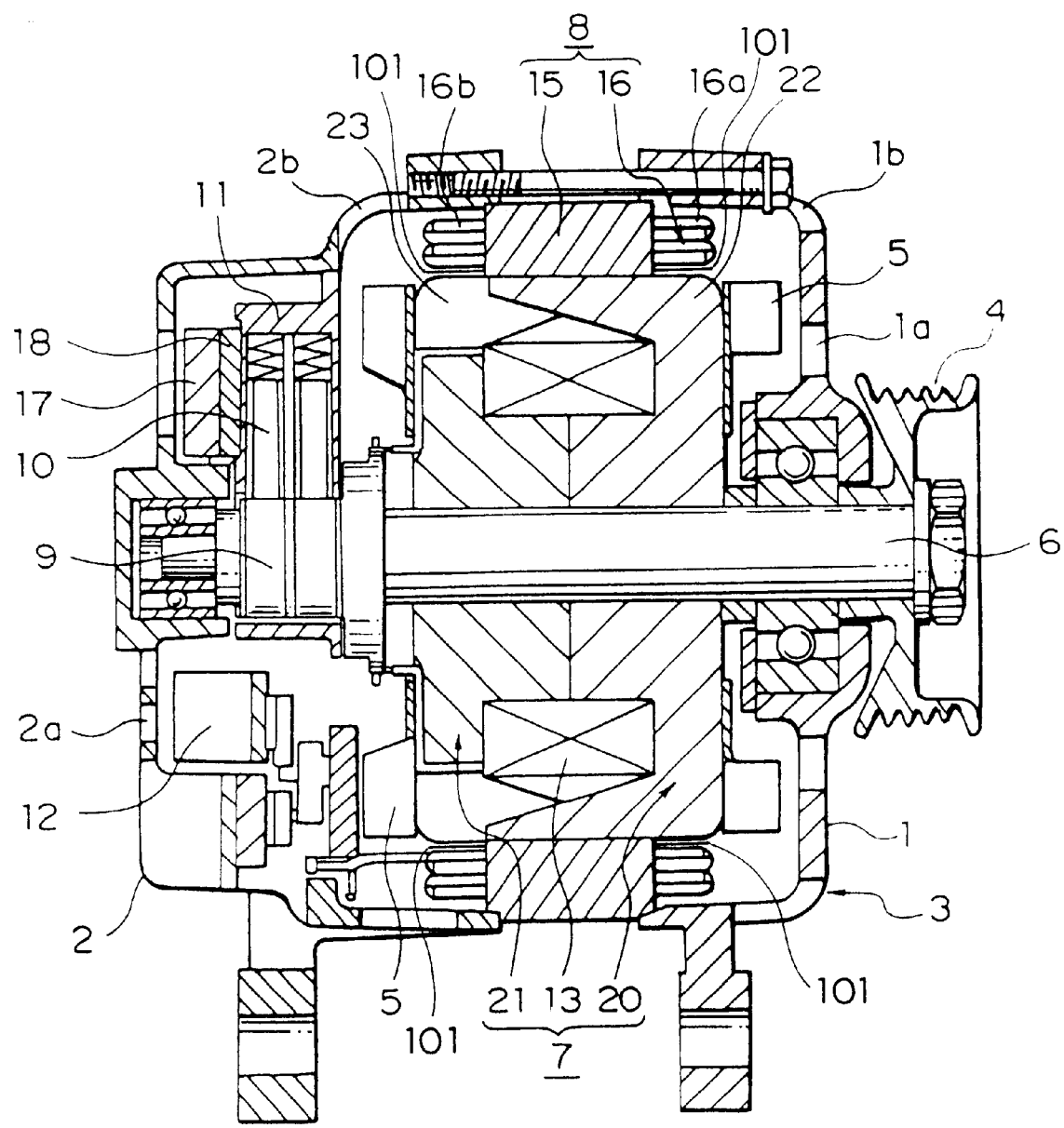
FIG. 1 is a cross section showing a construction of an alternator according to Embodiment 1 of the present invention.
Figure 2:
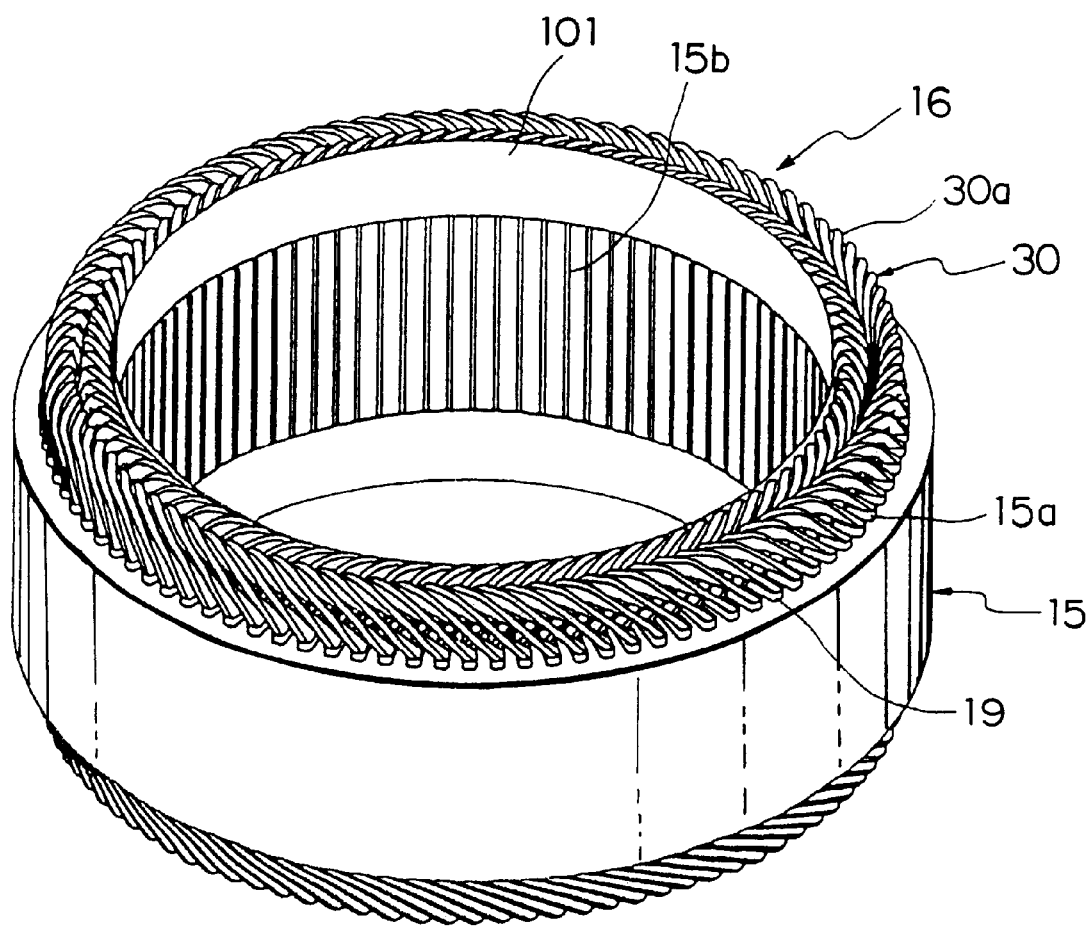
FIG. 2 is a perspective showing a stator of this alternator.
Figure 3:
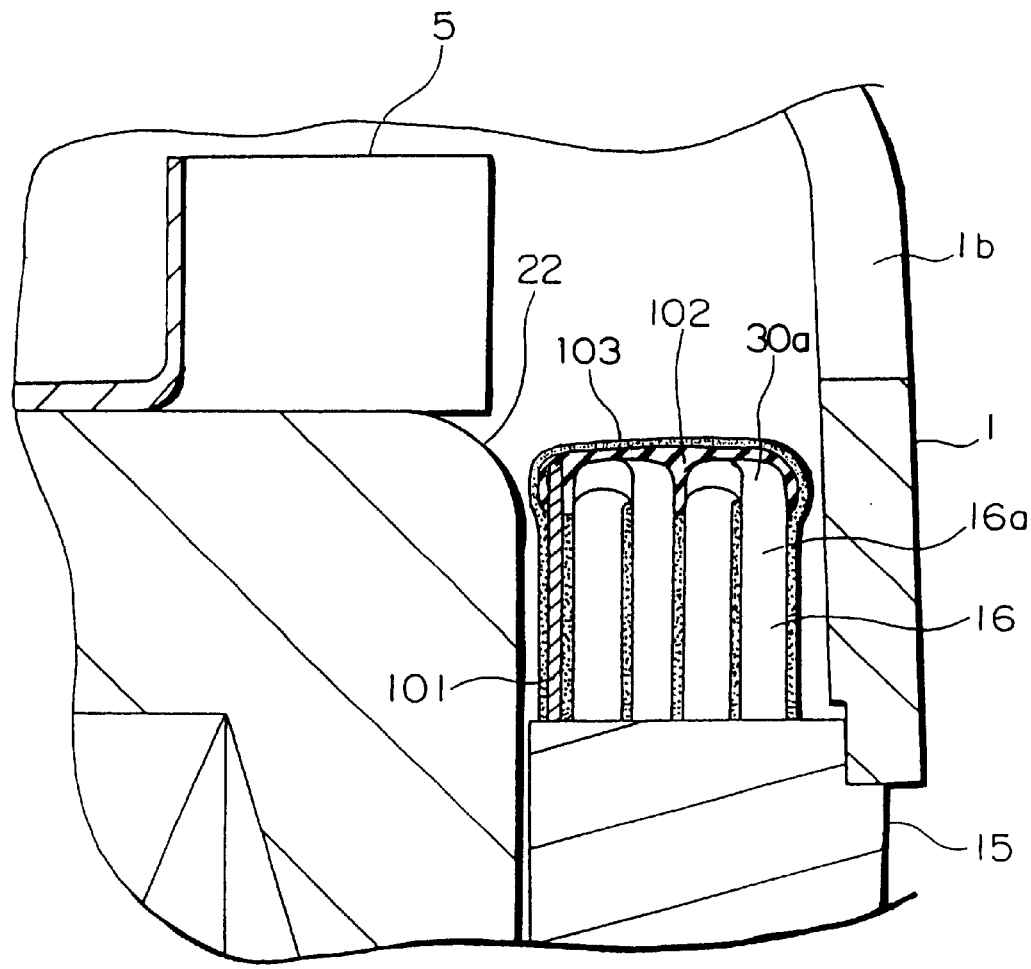
FIG. 3 is a partial cross section of the stator of this alternator.
Figure 4:
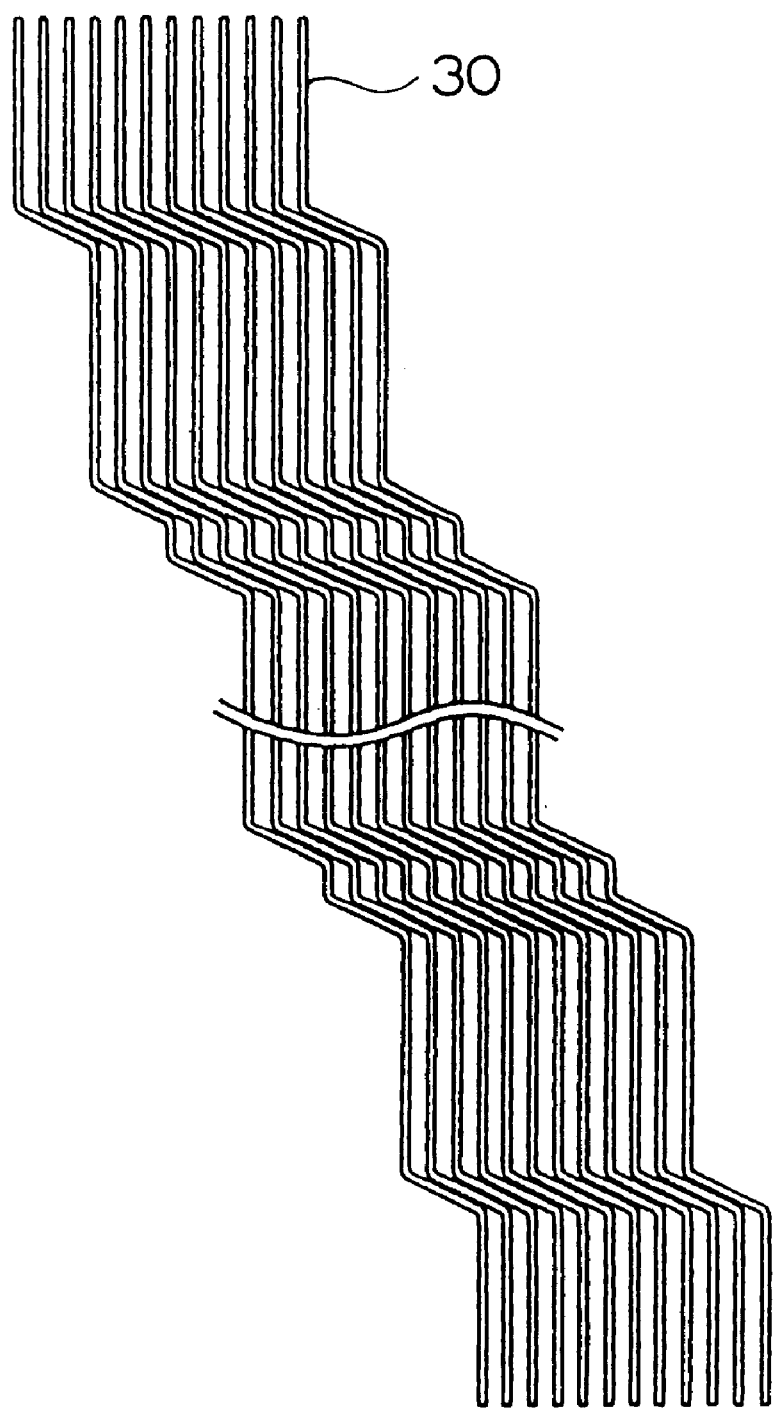
FIG. 4 is a diagram explaining the manufacturing process for winding groups constituting part of a stator winding used in this alternator.
Figure 5:
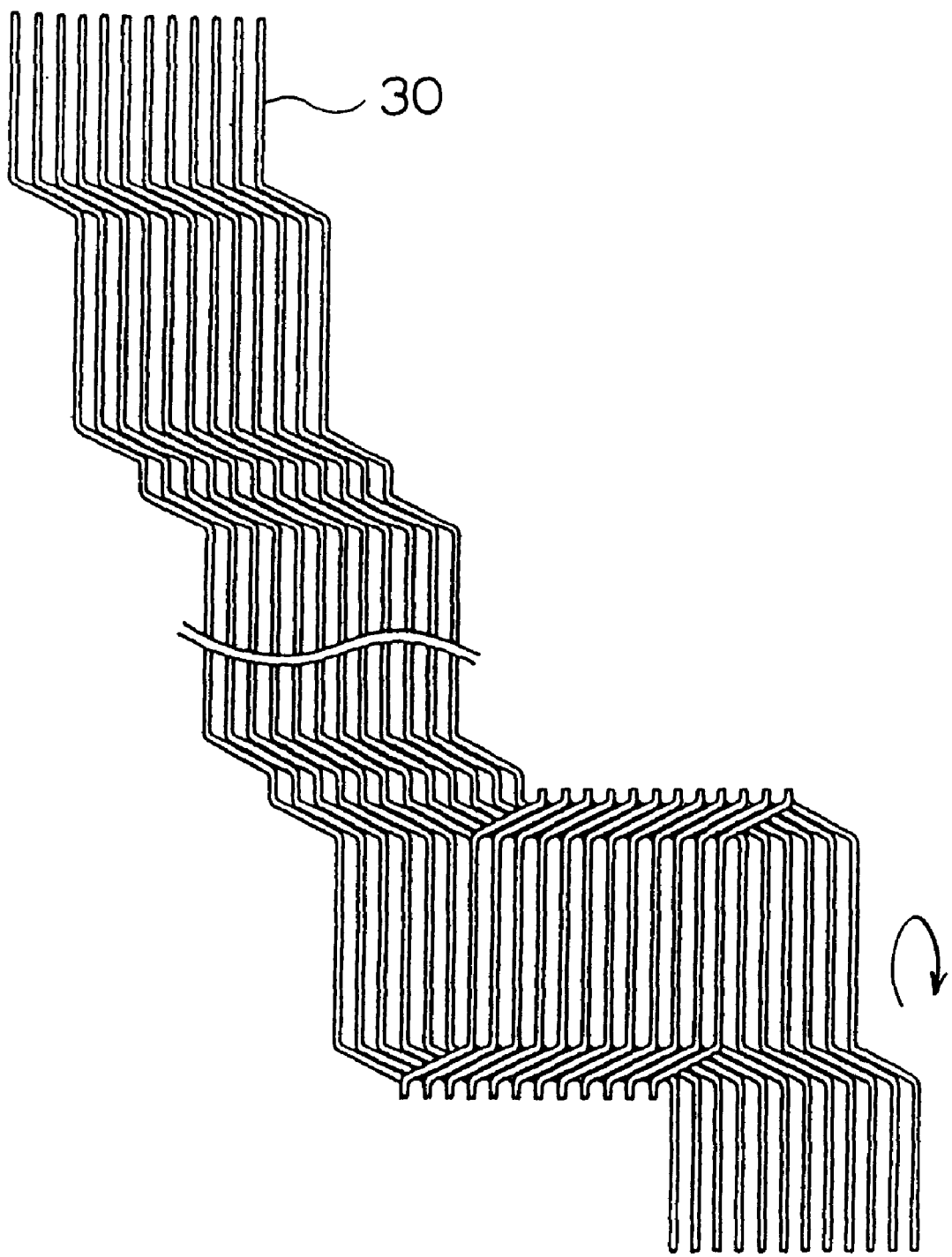
FIG. 5 is a diagram explaining the manufacturing process for winding groups constituting part of the stator winding used in this alternator.
Figures 6A, 6B:
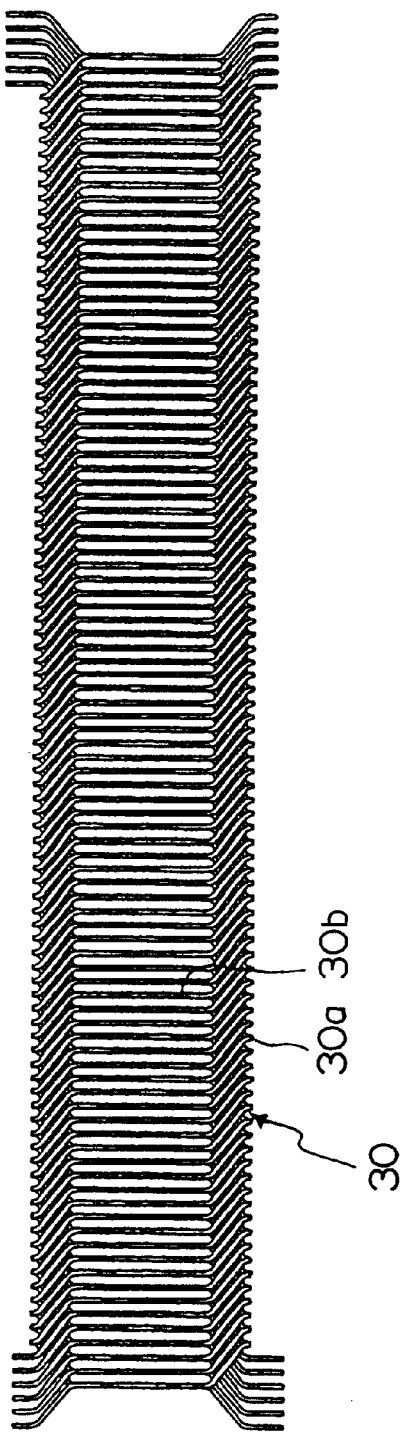
FIG. 6A is an end elevation showing an inner-layer wire-strand group constituting part of the stator winding used in this alternator.
FIG. 6B is a plan of the inner-layer wire-strand group constituting part of the stator winding used in this alternator.
Figure 7:
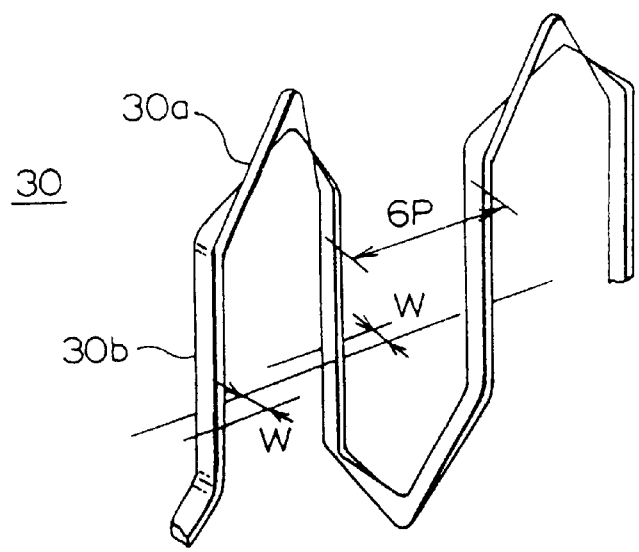
FIG. 7 is a perspective showing part of a strand of wire constituting part of the stator winding used in this alternator.
Figure 8:
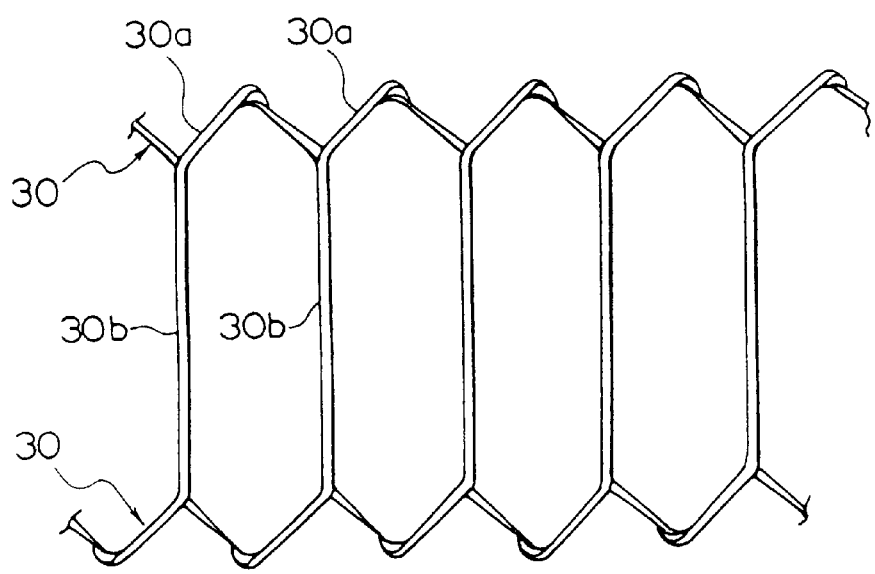
FIG. 8 is a diagram explaining the arrangement of strands of wire constituting part of the stator winding used in this alternator.

FIG. 1 is a cross section showing a construction of an alternator according to Embodiment 1 of the present invention. FIG. 2 is a perspective showing a stator of this alternator. FIG. 3 is a partial cross section of the stator of this alternator. FIGS. 4 and 5 are diagrams explaining the manufacturing process for winding groups constituting part of a stator winding used in this alternator. FIGS. 6A and 6B are diagrams showing an inner-layer wire-strand group constituting part of the stator winding used in this alternator, FIG. 6A being an end elevation and FIG. 6B being a plan. FIG. 7 is a perspective showing part of a strand of wire constituting part of the stator winding used in this alternator. FIG. 8 is a diagram explaining the arrangement of strands of wire constituting part of the stator winding used in this alternator.

Figure 10A:
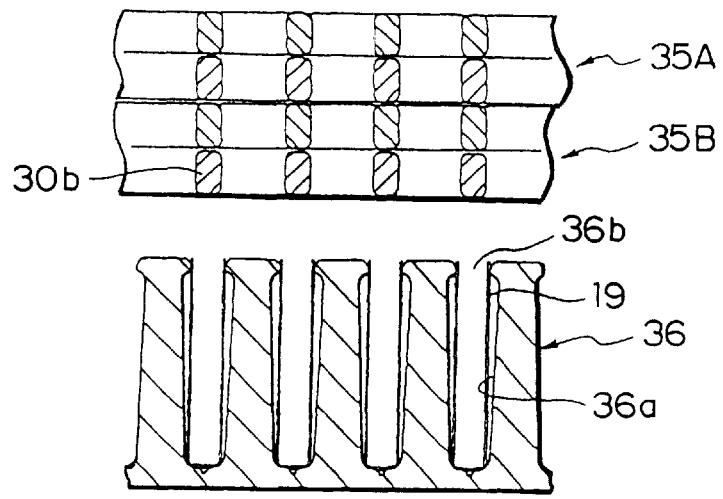
FIG. 10A is a cross section explaining the manufacturing process for the stator used in this alternator.
Figure 10B:
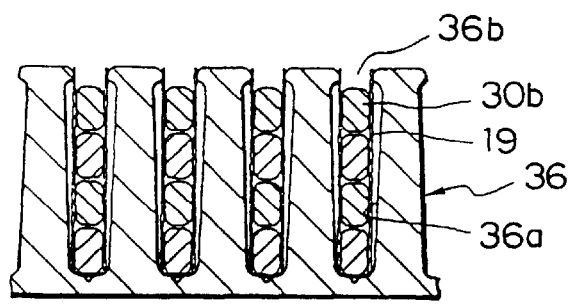
FIG. 10B is a cross section explaining the manufacturing process for the stator used in this alternator.
Figure 10C:
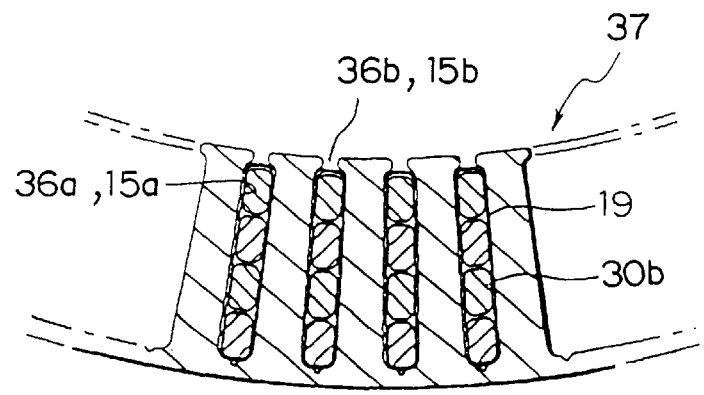
FIG. 10C is a cross section explaining the manufacturing process for the stator used in this alternator.

FIGS. 9A and 9B are diagrams explaining the construction of a stator core used in this alternator, FIG. 9A being a side elevation and FIG. 9B being a rear elevation. FIGS. 10A, 10B, and 10C are cross sections explaining the manufacturing process for the stator used in this alternator. Moreover, output wires and crossover connections have been omitted from FIG. 2.

In FIG. 1, the alternator is constructed by rotatably mounting a Lundell-type rotor 7 by means of a shaft 6 inside a case 3 constituted by an aluminum front bracket 1 and an aluminum rear bracket 2, and fastening a stator 8 to an inner wall of the case 3 so as to cover an outer circumferential side of the rotor 7.

The shaft 6 is rotatably supported in the front bracket 1 and the rear bracket 2. A pulley 4 is fastened to a first end of this shaft 6 such that rotational torque from an engine can be transmitted to the shaft 6 by means of a belt (not shown).

Slip rings 9 for supplying electric current to the rotor 7 are fastened to a second end of the shaft 6, and a pair of brushes 10 are housed in a brush holder 11 disposed inside the case such that the pair of brushes 10 slide in contact with the slip rings 9. A regulator 18 for adjusting the magnitude of alternating voltage generated in the stator 8 is fastened by adhesive to a heat sink 17 fitted onto the brush holder 11. A rectifier 12 which is electrically connected to the stator 8 and converts alternating current generated in the stator 8 into direct current is mounted inside the case 3.

The rotor 7 is composed of a rotor coil 13 for generating magnetic flux on passage of electric current, and a pair of pole cores 20 and 21 disposed so as to cover the rotor coil 13, magnetic poles being formed in the pole cores 20 and 21 by magnetic flux generated in the rotor coil 13. The pair of pole cores 20 and 21 are made of iron, each has eight claw-shaped magnetic poles 22 and 23 disposed on an outer circumferential perimeter at even pitch in a circumferential direction so as to project axially, and the pole cores 20 and 21 are fastened to the shaft 6 facing each other such that the claw-shaped magnetic poles 22 and 23 intermesh. In addition, fans 5 functioning as a cooling means are fastened to first and second axial ends of the rotor 7.

Air intake openings 1a and 2a are disposed in axial end surfaces of the front bracket 1 and the rear bracket 2, and air discharge openings 1b and 2b are disposed in outer circumferential shoulder portions of the front bracket 1 and the rear bracket 2, facing a radially outer side of front-end and rear-end coil end groups 16a and 16b of a polyphase stator winding 16.

As is clearly shown in FIGS. 2 and 3, the stator 8 includes: a cylindrical stator core 15 composed of a laminated core formed with a number of slots 15a extending axially at a predetermined pitch in a circumferential direction; the polyphase stator winding 16 functioning as a winding coil wound into the stator core 15; and insulators 19 installed in each of the slots 15a for electrically insulating the polyphase stator winding 16 from the stator core 15.

The polyphase stator winding 16 includes a number of windings in each of which one strand of wire 30 is folded over outside the slots 15a at end surfaces of the stator core 15 and wound into a wave winding so as to alternately occupy an inner layer and an outer layer in a slot depth direction within slots 15a a predetermined number of slots apart. In this case, the stator core 15 is formed with ninety-six slots 15a at even pitch so as to house two sets of three-phase stator winding portions such that the number of slots housing each phase of the winding portions corresponds to the number of magnetic poles (sixteen) in the rotor 7. Long, insulated copper wire material having a rectangular cross section, for example, is used in the strands of wire 30.

A shielding material 101 is disposed so as to cover inner circumferential surfaces of the coil end groups 16a and 16b which extend outwards from front and rear end surfaces of the stator core 15. The shielding material 101 is made of aluminum prepared into a thin plate shape having a thickness of 0.1 mm, for example, and is disposed in a general cylindrical shape so as to face the claw-shaped magnetic poles 22 and 23. An axial height dimension of the shielding material 101 is generally the same height as an axial height dimension of the coil end groups 16a and 16b. Moreover, an anodizing process is applied to a surface of the aluminum shielding material 101 which comes into contact with the coil for electrical insulation.

In processing the coil ends, which includes mounting the shielding material 101, after a cylindrical core 37 is formed by rolling up a parallelepiped core 36, the shielding material 101 is first disposed on the inner circumferential surfaces of the coil end groups 16a and 16b so as to cover the inner circumferential surfaces. Next, in this state, an epoxy resin 102 functioning as a first resin is applied to apex portions of the coil end groups 16a and 16b, that is to say, axial end portions of the coil end groups 16a and 16b. The epoxy resin 102 is applied by immersing the apex portions of the coil end groups 16a and 16b into an immersion tank containing melted epoxy resin. This epoxy resin 102 is applied with the objectives of improving insulation by compensating for scraping away of an insulating coating on the strands of wire 30 which are bent at an apex portion of return portions 30a, and of securing one side of the shielding material 101. Application of this epoxy resin 102 prevents interference noise due to irregularities on the return portions 30a.

Thereafter, a varnish 103 functioning as a second resin is applied so as to completely cover the coil end groups 16a and 16b, the shielding material 101, and the epoxy resin 102. The varnish 103 is disposed by dripping the varnish 103 and allowing the varnish 103 to permeate coil end portions while rotating the cylindrical core 37 with the axis of the cylindrical core 37 horizontal or inclined at a predetermined angle. The varnish 103 permeates minute gaps between the shielding material 101 and the strands of wire 30 as well as between the strands of wire 30, covering the entire surface extremely thinly, thereby improving insulation performance and overall rigidity.

Moreover, in FIG. 3, thickness dimensions, etc., of the shielding material 101, the epoxy resin 102, and the varnish 103 are exaggerated for the purpose of explanation, but each is actually disposed extremely thinly.

The varnish 103 is disposed extremely thinly between the shielding material 101 and the strands of wire 30, securing the coil end groups 16a and 16b and the shielding material 101 together such that thermal conductivity is good. At the same time, the varnish 103 does not necessarily have to be disposed on the entire surface, and provided that the coil end groups 16a and 16b and the shielding material 101 are insulated from each other, the construction may be such that heat radiating from the coil end groups 16a and 16b is cooled partially through air and partially through the shielding material 101.

Next, while some repetition of the process may occur, the method of assembly of the stator 8 will be explained in detail with reference to FIGS. 4 to 10.

First, as shown in FIG. 4, twelve long strands of wire 30 are simultaneously bent in the same plane to form a lightning-bolt shape. Then, a wire-strand group 35A, shown in FIGS. 6A and 6B, is prepared by progressively folding the strand at right angles, as indicated by the arrow in FIG. 5, using a jig. In addition, a wire-strand group 35B (not shown) including crossover connections and output wires is prepared in a similar manner. The wire-strand groups 35A and 35B are then annealed for ten minutes at 300° C. so that the parallelepiped core 36 mounted with the wire-strand groups 35A and 35B can be easily formed into an annular shape.

Moreover, as shown in FIG. 7, each strand of wire 30 is formed by bending it into a planar pattern in which straight portions 30b connected by the return portions 30a are lined up at a pitch of six slots (6P). Adjacent straight portions 30b are offset by a distance equal to one width (W) of the strands of wire 30 by means of the return portions 30a. The wire-strand groups 35A and 35B are constructed by arranging six wire-strand pairs so as to be offset by a pitch of one slot from each other, each wire-strand pair being constituted by two strands of wire 30 formed in the above pattern which are offset by a pitch of six slots and arranged such that the straight portions 30b overlap as shown in FIG. 8. Six end portions of the strands of wire 30 each extend outwards from first and second sides at first and second ends of the wire-strand groups 35A and 35B. Furthermore, the return portions 30a are arranged so as to line up in rows on first and second side portions of the wire-strand groups 35A and 35B.

The parallelepiped core 36 is prepared as shown in FIG. 9 by laminating a predetermined number of sheets of SPCC material formed with trapezoidal slots 36a at a predetermined pitch (an electrical angle of 30°) and laser welding an outer portion thereof.

As shown in FIG. 10A, the insulators 19 are mounted in the slots 36a of the parallelepiped core 36, and the straight portions of the two wire-strand groups 35A and 35B are inserted so as to stack up within each of the slots. Thus, the two wire-strand groups 35A and 35B are installed in the parallelepiped core 36 as shown in FIG. 10B. At this time, the straight portions 30b of the strands of wire 30 are housed in a row of four in a radial direction within the slots 15a and are electrically insulated from the parallelepiped core 36 by the insulators 19. The two wire-strand groups 35A and 35B are stacked one on top of the other when installed in the parallelepiped core 36.

Next, the parallelepiped core 36 is rolled up and its ends abutted and welded to each other to obtain a cylindrical core 37, as shown in FIG. 10C. By rolling up the parallelepiped core 36, the slots 36a (corresponding to the slots 15a in the stator core) take on a generally rectangular cross-sectional shape, and opening portions 36b of the slots 36a (corresponding to opening portions 15b of the slots 15a) become smaller than the slot-width dimensions of the straight portions 30b.

In the alternator constructed in this manner, electric current is supplied from a battery (not shown) through the brushes 10 and the slip rings 9 to the rotor coil 13, generating magnetic flux. The claw-shaped magnetic poles 22 of the first pole core 20 are magnetized with north-seeking (N) poles by this magnetic flux, and the claw-shaped magnetic poles 23 of the first pole core 21 are magnetized with south-seeking (S) poles. At the same time, rotational torque from the engine is transmitted through the belt and the pulley 4 to the shaft 6, rotating the rotor 7. Thus, a rotating magnetic field is applied to the polyphase stator winding 16, generating electromotive force in the polyphase stator winding 16. This alternating electromotive force passes through the rectifiers 12 and is converted into direct current, the magnitude of the current is adjusted by the regulator 18, and the battery is recharged.

At the rear end, external air is drawn in through the air intake openings 2a disposed opposite the heat sinks of the rectifiers 12 and the heat sink 17 of the regulator 18, respectively, by rotation of the fans 5, flowing along the axis of the shaft 6, cooling the rectifiers 12 and the regulator 18, and is then deflected centrifugally by the fans 5, cooling the rear-end coil end group 16b of the polyphase stator winding 16 before being expelled to the outside through the air discharge openings 2b. At the same time, at the front end, external air is drawn in axially through the air intake openings 1a by rotation of the fans 5, and is then deflected centrifugally by the fans 5, cooling the front-end coil end group 16a of the polyphase stator winding 16 before being expelled to the outside through the air discharge openings 1b.

According to the present embodiment, because the shielding material 101 is disposed so as to cover the inner circumferential surfaces of the coil end groups 16a and 16b, collision with the cooling air flow is moderated, and interference noise and wind noise can be reduced because the surfaces facing the rotor 7 become flat.

According to the present embodiment, the varnish 103 is disposed very lightly. For that reason, the strands of wire 30 are substantially exposed compared to the conventional example except for the portions covered by the shielding material 101, and for that reason, heat dissipation from the polyphase stator winding 16 is not hindered and output from the alternator is not reduced.

Here, the shielding material 101 does not necessarily have to be disposed on both stator coil end groups. In particular, it is effective to dispose the shielding material 101 only on a coil end group at one end where there is a lot of cooling air flow and a large amount of wind noise is generated.

The coil end groups 16a and 16b are constructed by arranging the return portions 30a in rows circumferentially. Thus, the height to which the coil end groups extend outwards from the stator core 15 can be reduced compared to the conventional coil end groups in which end portions of conductor segments were joined to each other. Thus, wind resistance in the coil end groups 16a and 16b is reduced further, enabling the reduction of wind noise due to the rotation of the rotor 7. Coil leakage reactance in the coil ends is also reduced, improving output and efficiency.

Four strands of wire 30 are arranged so as to line up in a row radially within each slot 15a, and the return portions 30a are arranged to line up in two rows circumferentially.

Thus, the return portions 30a constituting the coil end groups 16a and 16b are each divided into two rows radially, enabling the height to which the coil end groups 16a and 16b extend outwards from the stator core 15 to be reduced. As a result, wind resistance in the coil end groups 16a and 16b is reduced, enabling the reduction of wind noise due to the rotation of the rotor 7.

The return portions 30a which are folded over at the end surfaces of the stator core 15 each connect two straight portions 30b disposed in different layers in different slots 15a six slots apart. Thus, because interference between the coil ends in each phase is suppressed, the radial thickness of the coil ends is reduced allowing space to be formed to mount the shielding material 101, and the space factor of the stator winding is increased, increased output can be achieved.

Furthermore, each of the return portions 30a can be easily formed into a generally identical shape. Because circumferential irregularities in axial end surfaces of the coil end groups 16a and 16b can be suppressed by forming each of the return portions 30a into the generally identical shape, that is, by forming the return portions 30a which constitute the coil end groups 16a and 16b into the generally identical shape circumferentially, wind noise generated between the rotor 7 and the coil end groups 16a and 16b can be reduced. Furthermore, leak inductance becomes uniform, stabilizing output. In addition, this embodiment is suitable for affixing the shielding material 101 because the coil ends are lined up in rows.

Furthermore, because the return portions 30a are spaced in the circumferential direction and the spaces between the return portions 30a in the circumferential direction are formed into the generally identical shape, circumferential irregularities in the axial end portions of the coil end groups 16a and 16b can be suppressed, and in the coils on the outer circumferential side, cooling is improved and noise due to interference between the cooling air and the coil ends is reduced.

Because the return portions 30a are formed with the generally identical shape and arranged in rows in the circumferential direction, heat dissipation from each of the return portions 30a is even, and in addition, heat dissipation from each of the coil end groups 16a and 16b is also even. Thus, heat generated in the polyphase stator winding 16 is dissipated uniformly from each of the return portions 30a and dissipated uniformly from the first and second coil end groups 16a and 16b, and heat transfer to the shielding material 101 becomes uniform, improving the cooling of the polyphase stator winding 16.

Because the open dimensions of the opening portions 15b of the slots 15a are constructed so as to be smaller than the dimensions of the strands of wire 30 in the width direction of the slots 15a, the strands of wire 30 are prevented from dislodging from the slots 15a towards the radial inside and noise at the opening portions 15b due to interference with the rotor 7 can be reduced.

Because the straight portions 30b are formed with a rectangular cross section, the cross-sectional shape of the straight portions 30b fits neatly into the shape of the slots 15a when the straight portions 30b are housed inside the slots 15a Thus, the space factor of the strands of wire 30 inside the slots 15a is easily increased, enabling improved transfer of heat from the strands of wire 30 to the stator core 15. Here in Embodiment 1, the straight portions 30b are formed with a rectangular cross section, but the cross-sectional shape of the straight portions 30b may be any generally rectangular shape which fits neatly into the generally rectangular shape of the slots. This generally rectangular shape is not limited to a true rectangular shape and may be a square shape, a shape composed of four flat surfaces with rounded corners, or an elongated elliptical shape in which the short sides of the rectangle are made into arcs, etc.

Because the strands of wire 30 are formed with a rectangular cross section, the surface area radiating heat from the return portions 30a constituting the coil ends is increased, efficiently dissipating heat generated by the polyphase stator winding 16. In addition, by disposing the long sides of the rectangular cross section parallel to the radial direction, gaps can be ensured between the return portions 30b, making it possible for the cooling air on the outer circumferential side to pass inside the coil end groups 16a and 16b, improving cooling. Because surfaces of the coil end groups 16a and 16b can be constructed flatly, adhesion of the shielding material 101 is improved.

The stator 8 according to Embodiment 1 can be prepared by inserting the wire-strand group 35 which is composed of continuous wire into the slots 36a in the parallelepiped core 36 through the opening portions 36b and then rolling the parallelepiped core 36 into an annular shape. Thus, because the open dimensions of the opening portions 36b of the slots 36a can be made larger than the dimensions of the strands of wire 30 in the width direction of the slots, the operation of inserting the wire-strand group 35 is improved. Furthermore, because the open dimensions of the opening portions 36b of the parallelepiped core 36 can be made smaller than the dimensions of the strands of wire 30 in the width direction of the slots when the parallelepiped core 36 is rolled up, the space factor is increased, enabling output to be improved. Thus, wind noise from the rotor is also reduced. In addition, even if the number of slots is increased, the productivity of the stator will not deteriorate.

Because the height of the coil end groups 16a and 16b is low and there are not many joint portions, noise caused by interference between the coil end groups 16a and 16b and the cooling air flow formed by the fans 5 due to rotation of the rotor 7 is reduced. Because there are not many joint portions, insulation from the metal shielding material 101 is not hindered. Because the shape of both coil end groups 16a and 16b is generally identical and the fans 5 are disposed on both ends of the rotor 7, the coil end groups 16a and 16b are cooled in a balanced manner, reducing the temperature of the stator winding uniformly and greatly.

Now, the fans 5 do not necessarily have to be disposed on both axial ends of the rotor 7, they may be disposed in consideration of the stator winding or the positions of the rectifiers which are large heat-generating bodies. For example, the coil ends of the stator winding which are large heat-generating bodies can be disposed on the discharge side of a fan with a large cooling speed and a fan can be disposed on an end portion of the rotor at the end where the rectifiers are disposed. Furthermore, when mounted to an automotive engine, because the pulley is normally connected to a crankshaft by means of a belt, the fan may be disposed at the end away from the pulley so that the cooling exhaust from the fan does not affect the belt. Moreover, shoulder portions of the claw-shaped magnetic poles 22 and 23 of the rotor 7 have a blowing action, and because they can be used as a cooling means, the effects of the present invention can be achieved even without the fans.

Because the axial length of the stator 8 including the coil ends is shorter than the axial length of the pole cores 20 and 21, compactness can be achieved. When the fans 5 are disposed on both axial end portions of the rotor 7, because there are no coil ends on the discharge side of the fans, wind resistance is significantly reduced, thereby reducing wind noise and suppressing temperature increases in internal parts requiring cooling, such as the rectifiers 12.

Moreover, in Embodiment 1, in processing the coil ends which includes attaching the shielding material 101, the shielding material 101 is secured by the epoxy resin 102 disposed on the apex portion of the coil end groups 16a and 16b and by the varnish 103 which completely covers the coil end portions, but the method of securing the shielding material 101 is not limited thereto. For example, the shielding material 101 may also be fastened solely by an adhesive having good thermal conductivity, or secured by crimping several places circumferentially using a number of securing members made of metal, for example. That is to say, the method for securing the shielding material 101 is not limited to the present embodiment, and the effects can be achieved provided that the shielding material 101 is secured to the coil end groups 16a and 16b by some means.

In the present embodiment, the varnish 103 is used for the final fastening of the shielding material 101, but it is sufficient to use any material with good thermal conductivity for the fastening material. By using such a material, heat can be transferred from the polyphase stator winding 16 to the shielding material 101 satisfactorily, effectively dissipating heat generated in the polyphase stator winding 16.

In addition, in the present embodiment, the shielding material 101, which is disposed so as to cover the inner circumferential surfaces of the coil end groups 16a and 16b, is prepared from aluminum. However, the shielding material 101 is not limited to aluminum and may also be prepared from stainless steel, nylon, or thin-film adhesive tape, for example. In particular, because the stator of an automotive alternator is exposed to high temperatures over 200° C., by using a polyimide resin or a liquid crystal polymer when a resin is used for the shielding material 101, the stator obtained will have superior heat resistance.

In addition, in the present embodiment, as described above, the stator winding has the long strands of wire 30 wound so as to alternately occupy the inner layer and the outer layer in a slot depth direction of the slots 15a at intervals of a predetermined number of slots, the strands of wire folding back outside the slots 15a, but the stator winding is not limited thereto. That is to say, a continuous circuit may also be constructed by inserting a number of short coil segments having a general U shape from a first axial end of the stator core 15 and connecting coil segment ends of predetermined coil segments protruding from a second axial end of the stator core 15.

Embodiment 2

Figure 11:
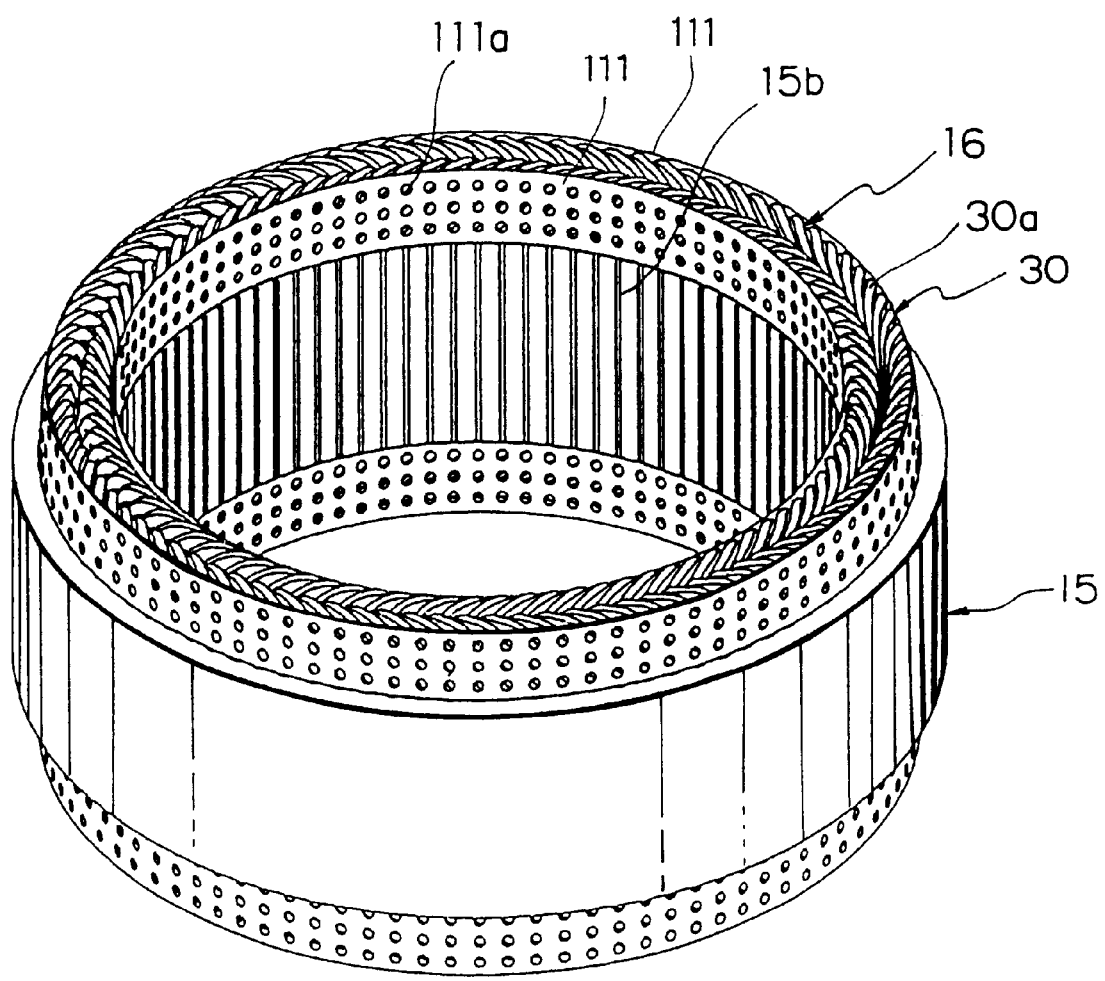
FIG. 11 is a perspective showing a stator of an alternator according to Embodiment 2 of the present invention.
Figure 12:
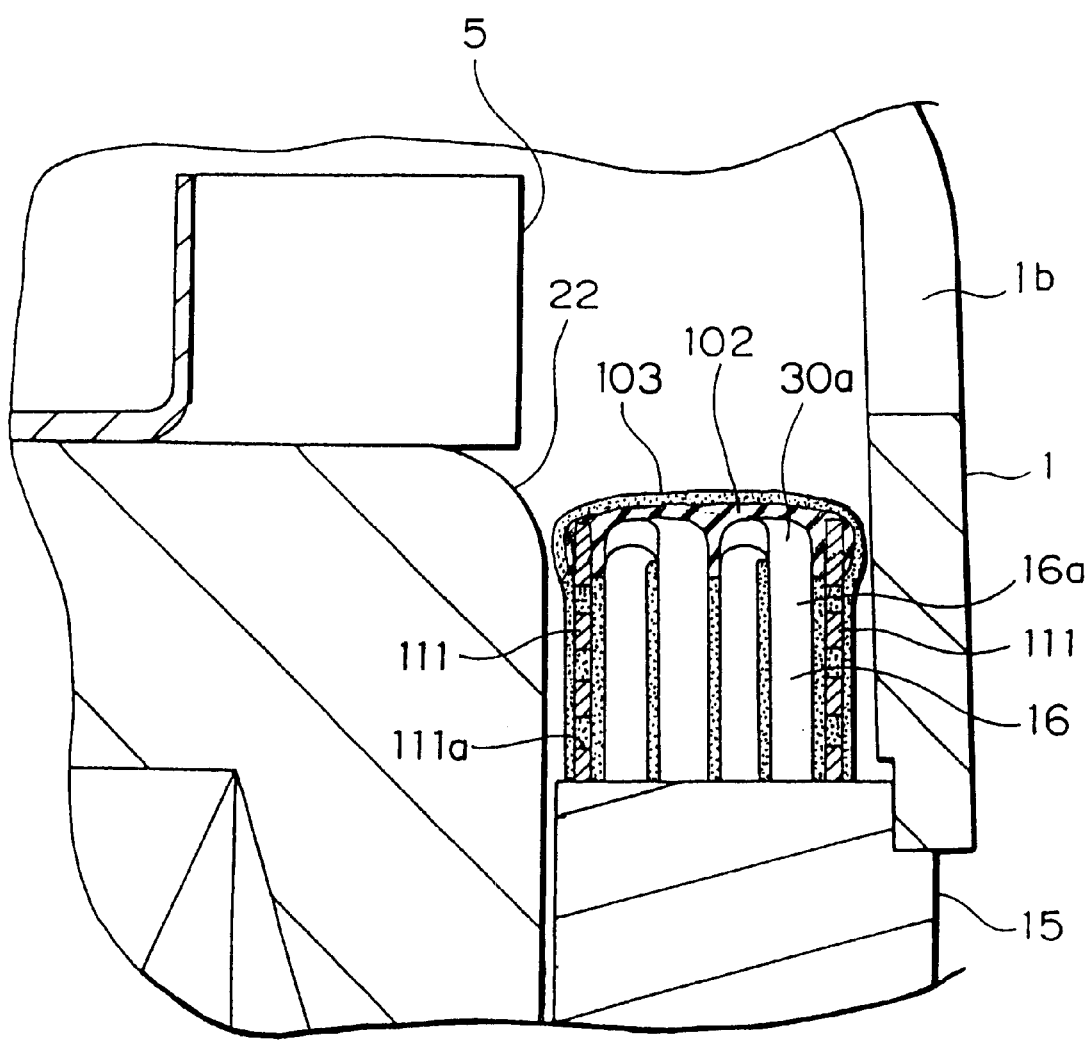
FIG. 12 is a partial cross section showing the stator of the alternator according to Embodiment 2 of the present invention.

FIG. 11 is a perspective showing a stator of an alternator according to Embodiment 2 of the present invention. FIG. 12 is a partial cross section of the stator. In the present embodiment, a shielding material 111 is disposed not only on inner circumferential surfaces of the coil end groups 16a and 16b, but also on outer circumferential surfaces of the coil end groups 16a and 16b. In addition, a plurality of apertures 111a are bored through the shielding material 111.

In the present embodiment, because the varnish 103 permeates the apertures 111a, the coil end groups 16a and 16b and the shielding material 111 are securely fastened.

The shielding material 111 is disposed so as to cover the inner circumferential surfaces and the outer circumferential surfaces of the coil end groups 16a and 16b. For that reason, collision with the cooling air flow can be further smoothed, reducing interference noise and wind noise. Because the apertures 111a are formed in a main surface of the shielding material 111, cooling ability is improved and the shielding material 111 is securely fastened. As in Embodiment 1, the epoxy resin 102 is applied to the apex portions of the coil ends, preventing interference noise due to irregularities on the axial end surface portions.

Moreover, the apertures 111a of the present embodiment are circular, but the apertures are not limited to that shape and may also be a polygonal shape or form a mesh.

Embodiment 3

Figure 16:
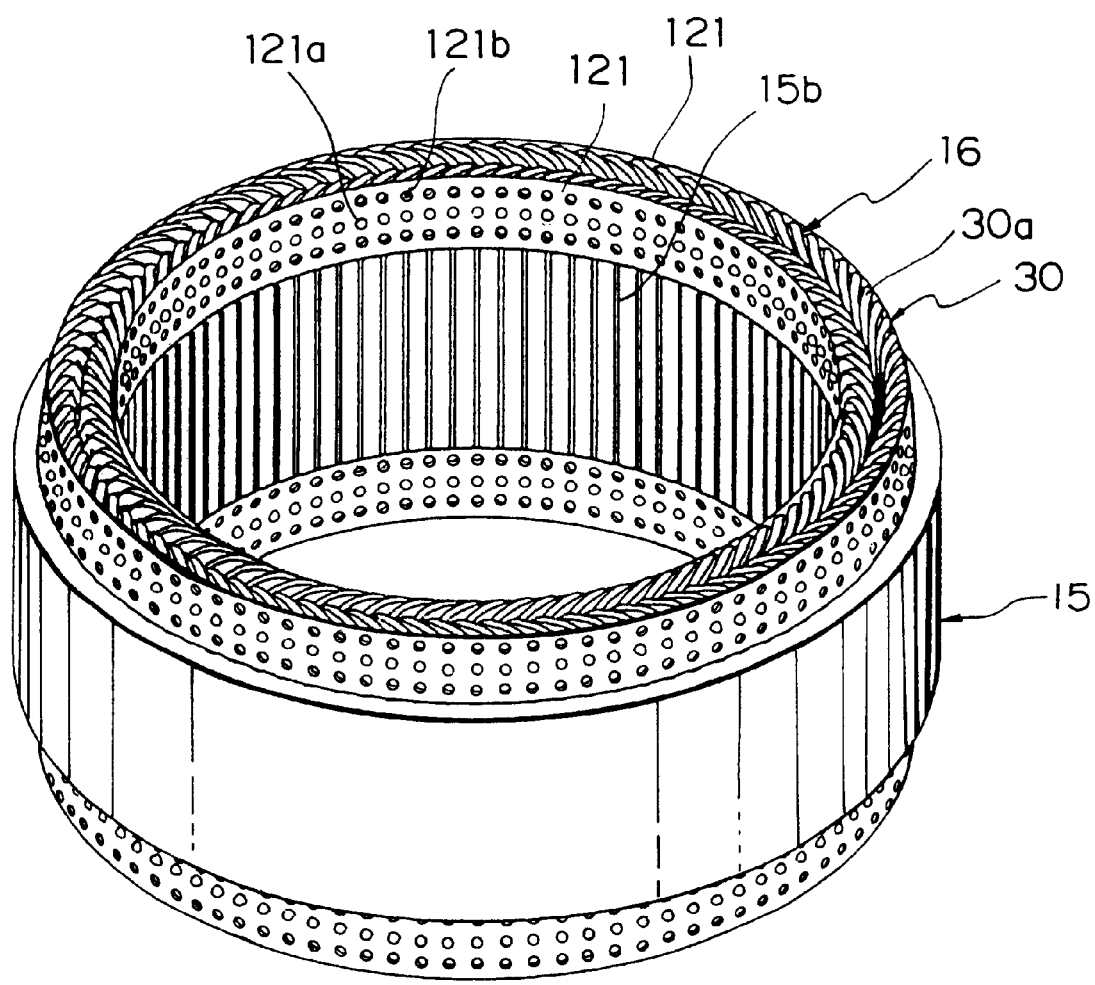
FIG. 16 is a perspective showing a stator according to Embodiment 3 of the present invention.

As shown in FIG. 16 showing a stator according to Embodiment 3 of the present invention, surfaces of a shielding material 121 are provided with protrusions and recesses. These protrusions and recesses may be disposed on only one surface, but when they are disposed on two surfaces, adherence to the coil end groups 16a and 16b is improved, making the securing of the shielding material 121 to the coil end groups 16a and 16b reliable, and cooling ability is improved because the area over which the cooling air flow comes into contact with the shielding material is increased.

When the shielding material 121 is provided on the inner circumferential surfaces of the coil end groups 16a and 16b as in the present embodiment, there is effectively no space between the inner circumferential surfaces of the coil end groups 16a and 16b and an outer circumferential surface of the rotor 7, and the protrusions and recesses described above are formed extremely small, at about 0.2 mm. For that reason, worsening of wind noise related to the cooling air flow passing over the surfaces of the shielding material 121 is effectively eliminated. The effect is achieved by increasing the coarseness of the surface of the shielding material 121 and there is no limit to the shape of the protrusions and recesses disposed on the surface.

Embodiment 4

Figure 13:
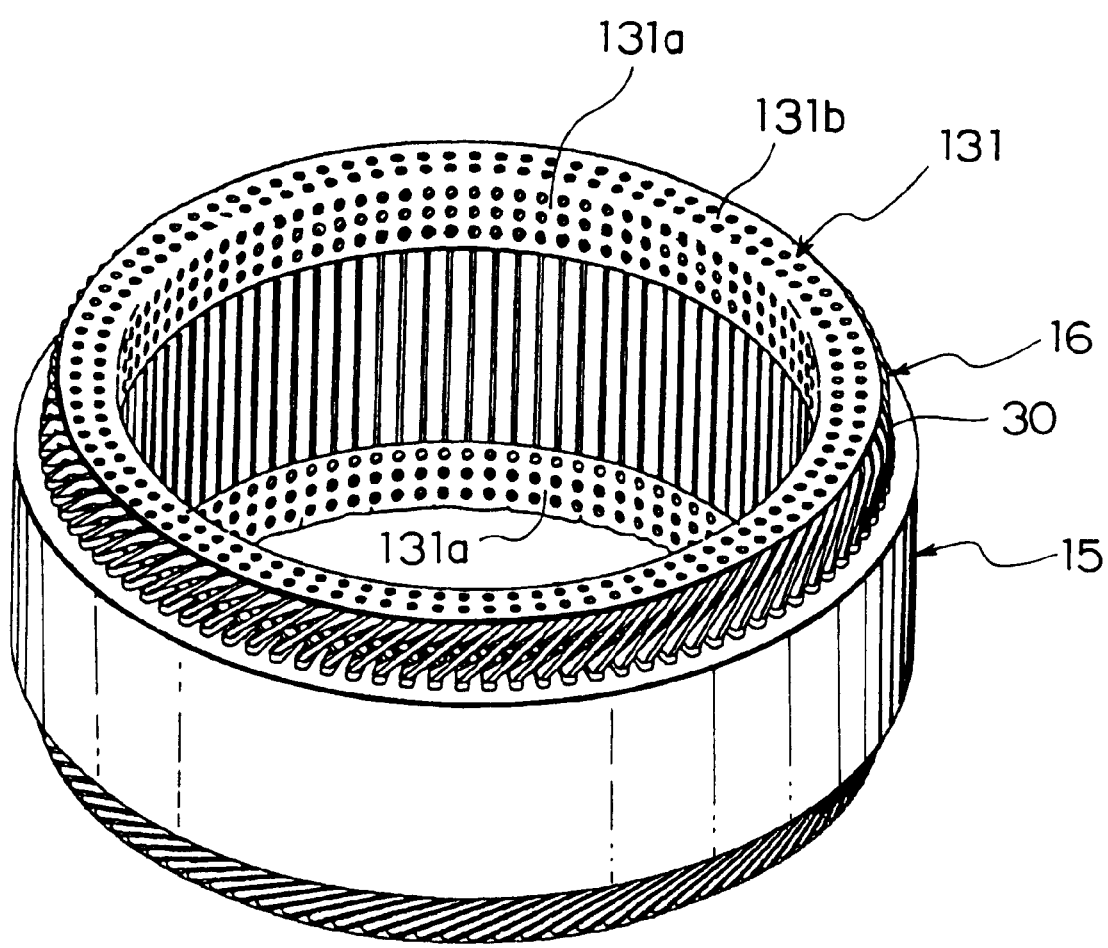
FIG. 13 is a perspective showing a stator of an alternator according to Embodiment 4 of the present invention.
Figure 14:
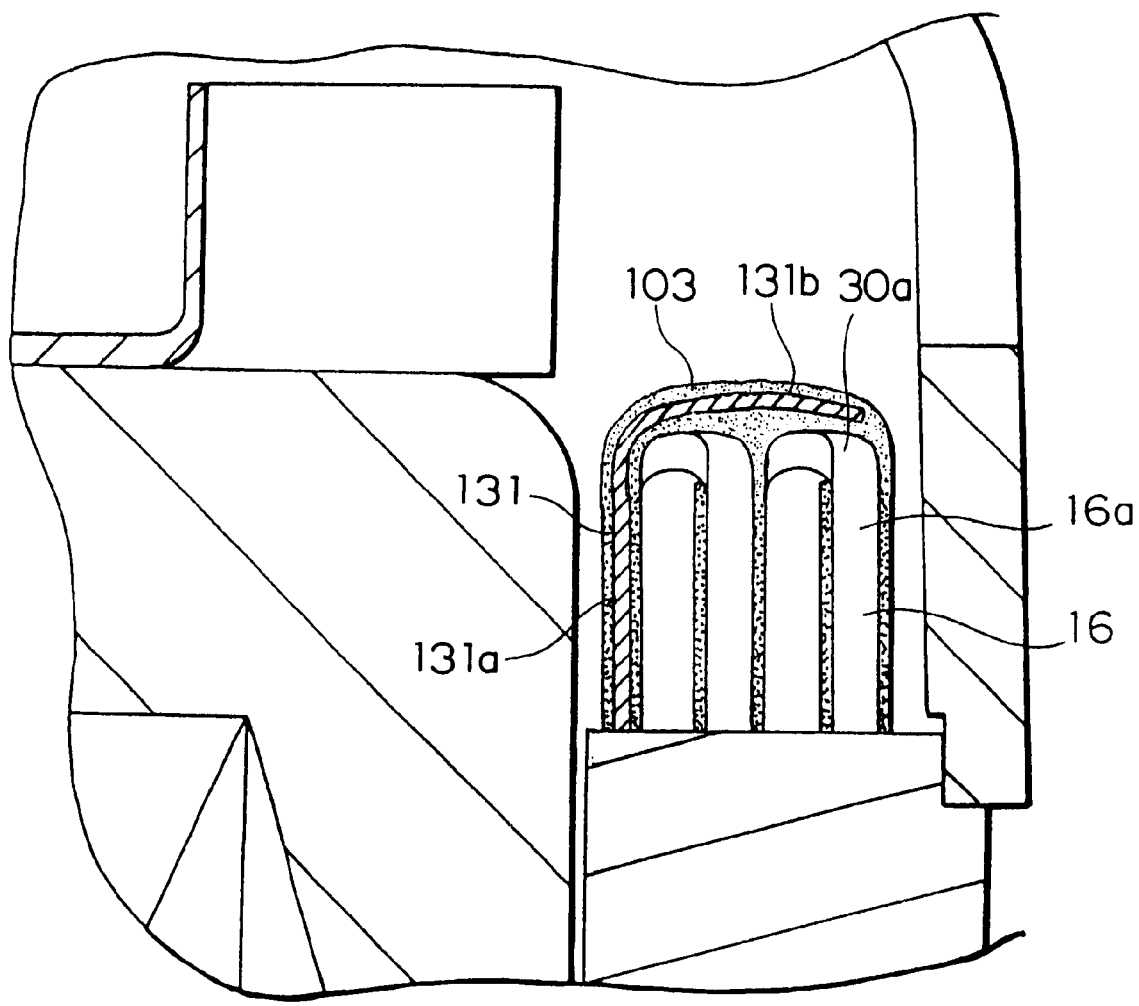
FIG. 14 is a partial cross section showing the stator of the alternator according to Embodiment 4 of the present invention.
Figure 15:
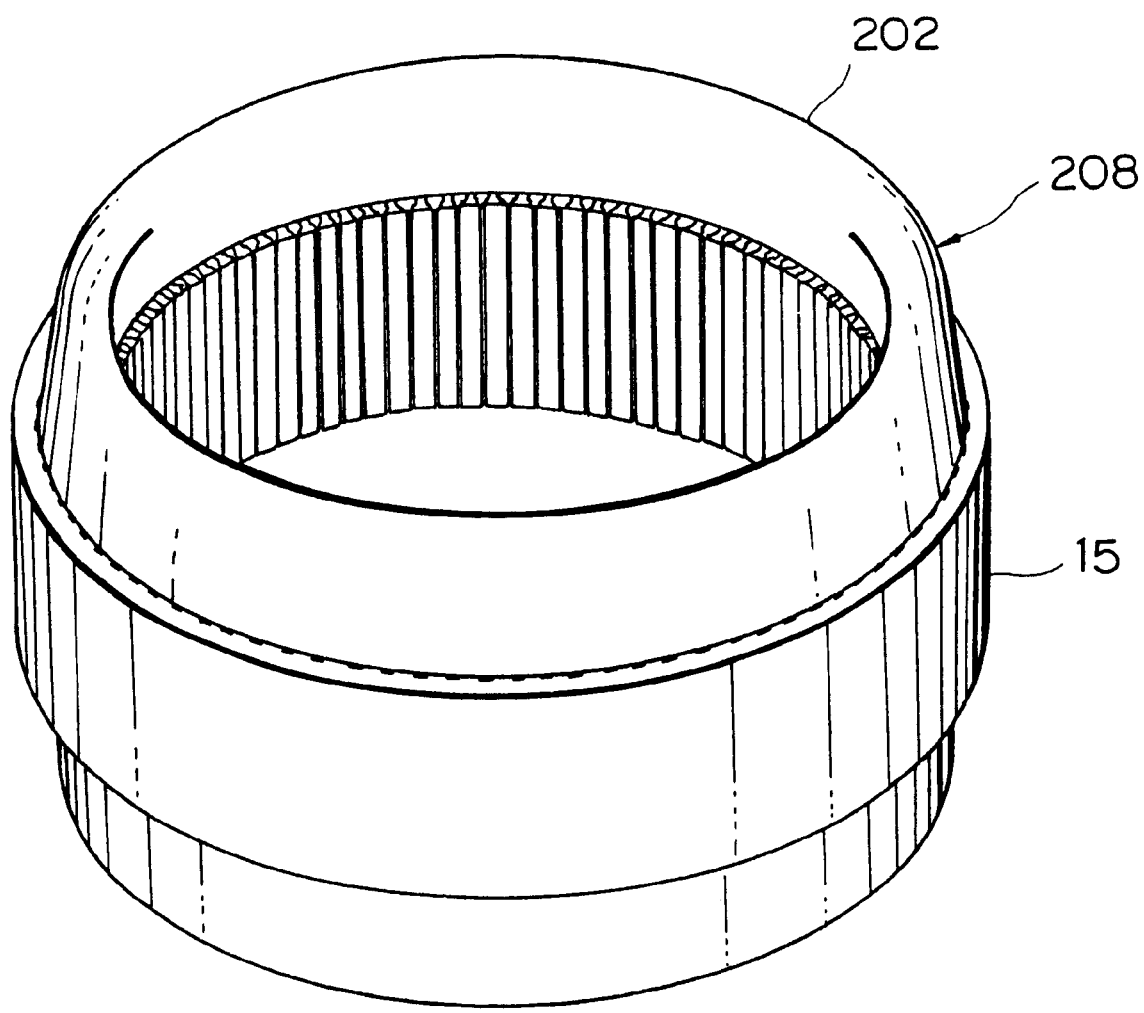
FIG. 15 is a perspective showing a stator of a conventional alternator.

FIG. 13 is a perspective showing a stator of an alternator according to Embodiment 4 of the present invention. FIG. 14 is a partial cross section of the stator. As is clearly shown by the cross section in FIG. 14, a shielding material 131 in the present embodiment is composed of flat portions 131a covering inner circumferential surfaces of the coil end groups 16a and 16b facing the rotor 7, and curved portions 131b extending radially from an upper edge and a lower edge of the flat portion 131a and covering axial end portions of the coil end groups 16a and 16b.

In the present embodiment, because the shielding material 131 is disposed so as to cover the coil end groups 16a and 16b from the inner circumferential surfaces facing the rotor 7 through to the axial end portions, collision with the cooling air flow can be further smoothed, further reducing interference noise and wind noise.

Because the present embodiment differs from the embodiments described above in that the shielding material 131 is disposed through to apex portions of the coil end groups, the occurrence of interference noise due to irregularities on the axial end portions of the coil ends can be further suppressed even if epoxy resin is not used.

In order to achieve the above object, according to one aspect of the present invention, there is provided an alternator including: a rotor including:
  claw-shaped magnetic poles fitted onto a rotating shaft; and
  a cooling means disposed on the claw-shaped magnetic poles; and a stator including:
  a stator core disposed facing the rotor, the stator core having a plurality of slots; and
  a stator winding installed in the stator core, the stator being cooled by the cooling means; and a bracket for supporting the rotor and the stator, a passage for a cooling air flow generated by the cooling means being disposed inside the bracket, the stator winding including coil ends extending outwards from end surfaces of the stator core, and a shielding material being disposed so as to cover at least an inner circumferential surface of the coil ends. For that reason, the cooling airflow passage in the alternator can be constructed so as to be smooth, improving cooling of the stator winding, and reducing wind noise.

Apertures may be formed in a main surface of the shielding material. For that reason, cooling ability is improved, and the shielding material can be securely fastened.

Protrusions and recesses may be formed on a surface of the shielding material. For that reason, cooling ability is improved, and the shielding material can be securely fastened.

The shielding material covering the coil ends may be secured by a second resin whose thermal conductivity is greater than a first resin disposed on the coil ends. For that reason, heat can be transferred from the stator winding to the shielding material satisfactorily, effectively dissipating heat generated in the stator winding.

Return portions of the stator winding crossing over between slots separated at a predetermined pitch may be formed with a generally identical shape in a circumferential direction in at least one of the coil ends of the stator. For that reason, circumferential irregularities in the return portions are reduced, making space efficiency superior, leakage inductance is made uniform, enabling stable output, and the generation of heat is made uniform, making the temperature uniform and reducing the overall temperature of the stator winding.

Spaces between circumferentially-adjacent return portions of the stator winding crossing over between slots separated at a predetermined pitch may be formed so as to be generally identical in at least one of the coil ends of the stator. For that reason, the cooling air is allowed to pass through uniformly, thereby improving cooling, and making wind resistance uniform in the circumferential direction, thereby reducing wind noise.

A cross-sectional shape of conductors of the stator winding within the slots may be a generally rectangular shape following a shape of the slots. For that reason, the space factor in the slots is thereby increased, improving output and efficiency. Furthermore, the contact surface area between the strands of wire and the stator core is increased, increasing thermal conductivity, thereby further reducing the temperature of the stator winding. Movement of the strands of wire within the slots is also prevented, suppressing damage to the insulation.

In addition, at least one of said coil ends may be disposed in close proximity to a downstream end of the cooling air flow generated by the cooling means. For that reason, the stator winding is cooled efficiently.

What is claimed is:

1. An alternator comprising:
a rotor comprising:
claw-shaped magnetic poles fitted onto a rotating shaft; and
a cooling means disposed on said claw-shaped magnetic poles; and a stator comprising:
a stator core disposed facing said rotor, said stator core having a plurality of slots; and
a stator winding installed in said stator core, said stator being cooled by said cooling means; and
a bracket for supporting said rotor and said stator,
a passage for a cooling air flow generated by said cooling means being disposed inside said bracket,
said stator winding comprising coil ends extending outwards from end surfaces of said stator core, and
a shielding material being disposed so as to cover at least an inner circumferential surface of said coil ends, wherein at least one of a part of an outer circumferential surface of said coil ends and a part of an outer axial end surface of said coil ends is not covered by said shielding material.

2. The alternator according to claim 1 wherein apertures are formed in a main surface of said shielding material.

3. The alternator according to claim 1 wherein protrusions and recesses are formed on a surface of said shielding material.

4. The alternator according to claim 1 wherein said shielding material covering said coil ends is secured by a second resin having a thermal conductivity which is greater than a thermal conductivity of a first resin disposed on said coil ends.

5. The alternator according to claim 1 wherein return portions of said stator winding crossing over between slots separated at a predetermined pitch are formed with a generally identical shape in a circumferential direction in at least one of said coil ends of said stator.

6. The alternator according to claim 1 wherein spaces between circumferentially-adjacent return portions of said stator winding crossing over between slots separated at a predetermined pitch are formed so as to be generally identical in at least one of said coil ends of said stator.

7. The alternator according to claim 1 wherein a cross-sectional shape of conductors of said stator winding within said slots is a generally rectangular shape following a shape of said slots.

8. The alternator according to claim 1 wherein at least one of said coil ends is disposed in close proximity to a downstream end of said cooling air flow generated by said cooling means.

9. The alternator according to claim 1, wherein the shielding material covers the inner circumferential surface and the outer circumferential surface of said coil ends, and the outer axial end surface of said coil ends is not covered by said shielding material.

10. The alternator according to claim 1, wherein the shielding material covers the inner circumferential surface and the outer axial end surface of said coil ends, and the outer circumferential surface of said coil ends is not covered by said shielding material.

* * * * *